United States Patent
Pattan

(10) Patent No.: US 10,498,782 B2
(45) Date of Patent: Dec. 3, 2019

(54) METHOD AND APPARATUS FOR EXPERIENCING A MULTIMEDIA SERVICE

(71) Applicant: Samsung Electronics Co., Ltd., Suwon-si, Gyeonggi-do (KR)

(72) Inventor: Basavaraj Jayawant Pattan, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 911 days.

(21) Appl. No.: 14/364,022

(22) PCT Filed: Dec. 12, 2012

(86) PCT No.: PCT/KR2012/010793
§ 371 (c)(1),
(2) Date: Jun. 9, 2014

(87) PCT Pub. No.: WO2013/089430
PCT Pub. Date: Jun. 20, 2013

(65) Prior Publication Data
US 2014/0324960 A1 Oct. 30, 2014

(30) Foreign Application Priority Data
Dec. 12, 2011 (IN) .......................... 4335/CHE/2011

(51) Int. Cl.
*H04L 29/06* (2006.01)
*H04N 21/4788* (2011.01)
(Continued)

(52) U.S. Cl.
CPC ...... *H04L 65/4076* (2013.01); *H04L 12/1818* (2013.01); *H04L 65/1069* (2013.01);
(Continued)

(58) Field of Classification Search
CPC ............ H04L 65/1033; H04L 65/1069; H04L 65/4076; H04L 65/4084; H04L 12/1818;
(Continued)

(56) References Cited

U.S. PATENT DOCUMENTS 5,583,561 A * 12/1996 Baker ................ H04N 7/17336
348/E7.073
6,522,325 B1 2/2003 Sorokin et al.
(Continued)

FOREIGN PATENT DOCUMENTS

CN 100413354 * 8/2008
EP 1 738 585 A1 1/2007
(Continued)

OTHER PUBLICATIONS

Samsung India Software Operations Pvt. Ltd.; System and Method for Immersive Social Experience Follow View: Prior Art Search Report; dated Dec. 7, 2011.
(Continued)

*Primary Examiner* — Tauqir Hussain
(74) *Attorney, Agent, or Firm* — Jefferson IP Law, LLP

(57) ABSTRACT

A method and an apparatus for obtaining a multimedia session are provided. The method includes transmitting a first request to a network entity to receive information on a content view of a second client device, transmitting a second request to the network entity to invite the second client device to join an existing multimedia session comprising the client device, and synchronizing the content view of the second client device with a content view of the existing multimedia session by using the assistance of the media managing server.

19 Claims, 14 Drawing Sheets

(51) Int. Cl.
*H04N 21/6543* (2011.01)
*H04N 21/472* (2011.01)
*H04N 21/2668* (2011.01)
*H04N 21/242* (2011.01)
*H04N 21/43* (2011.01)
*H04L 12/18* (2006.01)

(52) U.S. Cl.
CPC ........ *H04L 65/4084* (2013.01); *H04N 21/242* (2013.01); *H04N 21/2668* (2013.01); *H04N 21/4307* (2013.01); *H04N 21/4788* (2013.01); *H04N 21/47214* (2013.01); *H04N 21/6543* (2013.01); *H04L 65/1033* (2013.01)

(58) Field of Classification Search
CPC .............. H04L 65/4007; H04N 21/242; H04N 21/2668; H04N 21/4307; H04N 21/47214; H04N 21/4788; H04N 21/6543
See application file for complete search history.

(56) References Cited

U.S. PATENT DOCUMENTS

| | | | | |
|---|---|---|---|---|
| 2003/0093790 | A1* | 5/2003 | Logan | G06F 17/30265 725/38 |
| 2003/0152040 | A1* | 8/2003 | Crockett | H04M 3/56 370/260 |
| 2007/0005770 | A1 | 1/2007 | Kramer et al. | |
| 2007/0133565 | A1* | 6/2007 | Hyun | H04L 45/00 370/395.52 |
| 2007/0271586 | A1* | 11/2007 | Alperin | H04N 7/17336 725/109 |
| 2007/0299737 | A1 | 12/2007 | Plastina et al. | |
| 2008/0125104 | A1 | 5/2008 | You et al. | |
| 2008/0162712 | A1* | 7/2008 | Fu | H04L 63/0815 709/231 |
| 2008/0305813 | A1* | 12/2008 | Rao | H04M 1/7253 455/466 |
| 2009/0271820 | A1 | 10/2009 | Choi et al. | |
| 2009/0293079 | A1 | 11/2009 | McKee et al. | |
| 2010/0037267 | A1* | 2/2010 | Bennett | H04N 7/165 725/56 |
| 2010/0138486 | A1* | 6/2010 | Yang | H04L 65/4092 709/203 |
| 2010/0169917 | A1* | 7/2010 | Harboe | H04N 7/15 725/34 |
| 2010/0254370 | A1* | 10/2010 | Jana | H04L 65/1016 370/352 |
| 2010/0257280 | A1 | 10/2010 | Stokking et al. | |
| 2011/0004665 | A1 | 1/2011 | Kim et al. | |
| 2011/0119706 | A1 | 5/2011 | Scott et al. | |
| 2011/0280399 | A1* | 11/2011 | Chieze | H04N 21/4367 380/255 |
| 2012/0027256 | A1* | 2/2012 | Kiyohara | G06F 17/30029 382/103 |
| 2012/0030586 | A1* | 2/2012 | Ketkar | G06F 17/3089 715/751 |
| 2012/0087380 | A1* | 4/2012 | Tang | H04L 12/56 370/474 |
| 2012/0131110 | A1* | 5/2012 | Buyukkoc | H04L 65/4038 709/206 |
| 2012/0159527 | A1* | 6/2012 | Perez | H04N 21/42203 725/10 |
| 2012/0174175 | A1* | 7/2012 | Xu | H04N 5/782 725/110 |
| 2012/0226736 | A1* | 9/2012 | Falchuk | G06F 9/5061 709/203 |
| 2012/0243531 | A1* | 9/2012 | Meer | H04M 3/5183 370/352 |
| 2013/0326576 | A1* | 12/2013 | Zhang | H04N 21/21805 725/133 |
| 2014/0043430 | A1* | 2/2014 | Yu | H04N 7/15 348/14.08 |
| 2015/0067541 | A1* | 3/2015 | Owens | G06F 3/00 715/753 |
| 2015/0245079 | A1* | 8/2015 | Tremblay | H04H 20/18 725/116 |
| 2015/0334145 | A1* | 11/2015 | Jayaram | H04L 65/60 709/204 |

FOREIGN PATENT DOCUMENTS

| | | |
|---|---|---|
| EP | 2 056 601 A1 | 5/2009 |
| KR | 10-0750189 B1 | 8/2007 |
| KR | 10-2007-0092386 A | 9/2007 |
| KR | 10-2008-0027909 A | 3/2008 |
| KR | 10-2009-0067153 A | 6/2009 |
| KR | 10-2010-0084659 A | 7/2010 |
| KR | 10-2010-0103337 A | 9/2010 |
| WO | 2007-065826 A | 6/2007 |
| WO | 2011/066105 A1 | 6/2011 |

OTHER PUBLICATIONS

XP002457156 "AmigoTV: A Social TV Experience Through Triple-Play Convergence", Feb. 4, 2005.
XP031514033 "SIP based IPTV architecture for heterogeneous networks", Jun. 8, 2009.
European Office Action dated Sep. 10, 2018, issued in European Patent Application No. 12 857 798.8-1208.
Korean Office Action dated Jun. 13, 2019, issued in Korean Patent Application No. 10-2014-7018528.

* cited by examiner

METHOD AND APPARATUS FOR EXPERIENCING A MULTIMEDIA SERVICE

CROSS-REFERENCE TO RELATED APPLICATION(S)

This application is a U.S. National Stage application under 35 U.S.C. § 371 of an International application filed on Dec. 12, 2012, and assigned application number PCT/KR2012/010793, which claimed the benefit of a Indian patent application filed on Dec. 12, 2011, in the Indian Intellectual Property Office and assigned Serial number 4335/CHE/2011, the entire disclosures of which are hereby incorporated by reference.

TECHNICAL FIELD

The present disclosure relates to a system, apparatus, and method for experiencing an advanced multimedia service. More particularly, the present disclosure relates to an apparatus and method for following, sharing, and experiencing a multimedia service utilized by others.

BACKGROUND

Telepresence and such multimedia services are known in the art. Both software and hardware capabilities of devices that facilitate usage of such multimedia services have been on increase. It is of prime importance to ensure that there is no mismatch in different components of the multimedia services such as audio and video.

Further, close-to-reality effects that are to be achieved through the multimedia services are increasing constantly. In order to effectuate this in the devices, there may be a need in upgrading multiple entities and devices where a standard procedure for experiencing such multimedia services may be established.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

According to an aspect of the present disclosure, a method of obtaining a multimedia session in a client device is provided. The method includes transmitting a first request to a network entity to receive information on content view of a second client device, transmitting a second request to the network entity to invite the second client device to join an existing multimedia session comprising the client device, and synchronizing the content view of the second client device with a content view of the existing multimedia session by using the assistance of the media managing server.

In accordance with another aspect of the present disclosure, a method of obtaining multimedia service is provided. The method includes transmitting a first request with a set of preferences for obtaining a multimedia session with at least one of a session IDentifier (ID), a program ID, and a view ID, establishing the multimedia session with a media managing server and a media provider system based on the first request and the set of preferences, and transmitting a second request to the media managing server for inviting one or more client devices to share the multimedia session.

In accordance with yet another aspect of the present disclosure, a method of obtaining multimedia service is provided. The method includes receiving a first request with a set of preferences from a first client device to establish a multimedia session with a media provider system, establishing the multimedia session with the media provider system based on the set of preferences, receiving a second request from the first client device to invite one or more client devices to participate the multimedia session, ascertaining the set of preferences, details of the multimedia session, and whether the first client device is eligible to invite the one or more client devices, and transmitting an invitation to participate in the multimedia session to the one or more client devices upon ascertaining that the first client device is eligible to invite the one or more client devices.

In accordance with yet another aspect of the present disclosure, an apparatus for obtaining a multimedia service is provided. The apparatus includes a processor, and a memory connected to the processor. The memory is configured with one or more programs for obtaining the multimedia service, comprising a session module configured to transmit a first request with a set of preferences for obtaining a multimedia session with at least one of a session ID, a program ID, and a view ID, establish the multimedia session with a media managing server and a media provider system based on the first request and the set of preferences, and transmit a second request to the media managing server for inviting one or more client devices to share the multimedia session.

In accordance with another aspect of the present disclosure, an apparatus for a multimedia service is provided. The apparatus includes a processor and a memory connected to the processor. The memory is configured with one or more programs for providing an multimedia session, comprising a session support module configured to receive a first request with a set of preferences from a first client device to establish an multimedia session with a media provider system, establish the multimedia session with the media provider system based on the set of preferences, receive a second request from the first client device to invite one or more client devices, ascertain the set of preferences, details of the multimedia session and whether the first client device is eligible to invite the one or more client devices to participate in the multimedia session, and transmit an invitation to participate in the multimedia session to the one or more client devices upon ascertaining that the first client device is eligible to invite the one or more client devices.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the document, the terms "immersive multimedia service", "multimedia service", "immersive multimedia session", and "multimedia session" are interchangeably used and all imply a multimedia service or a multimedia session. Further, the terms "media provider system" and "content provider system" are used interchangeably which imply one and the same—one of the network entities that is capable of providing multimedia content.

Figure 1:
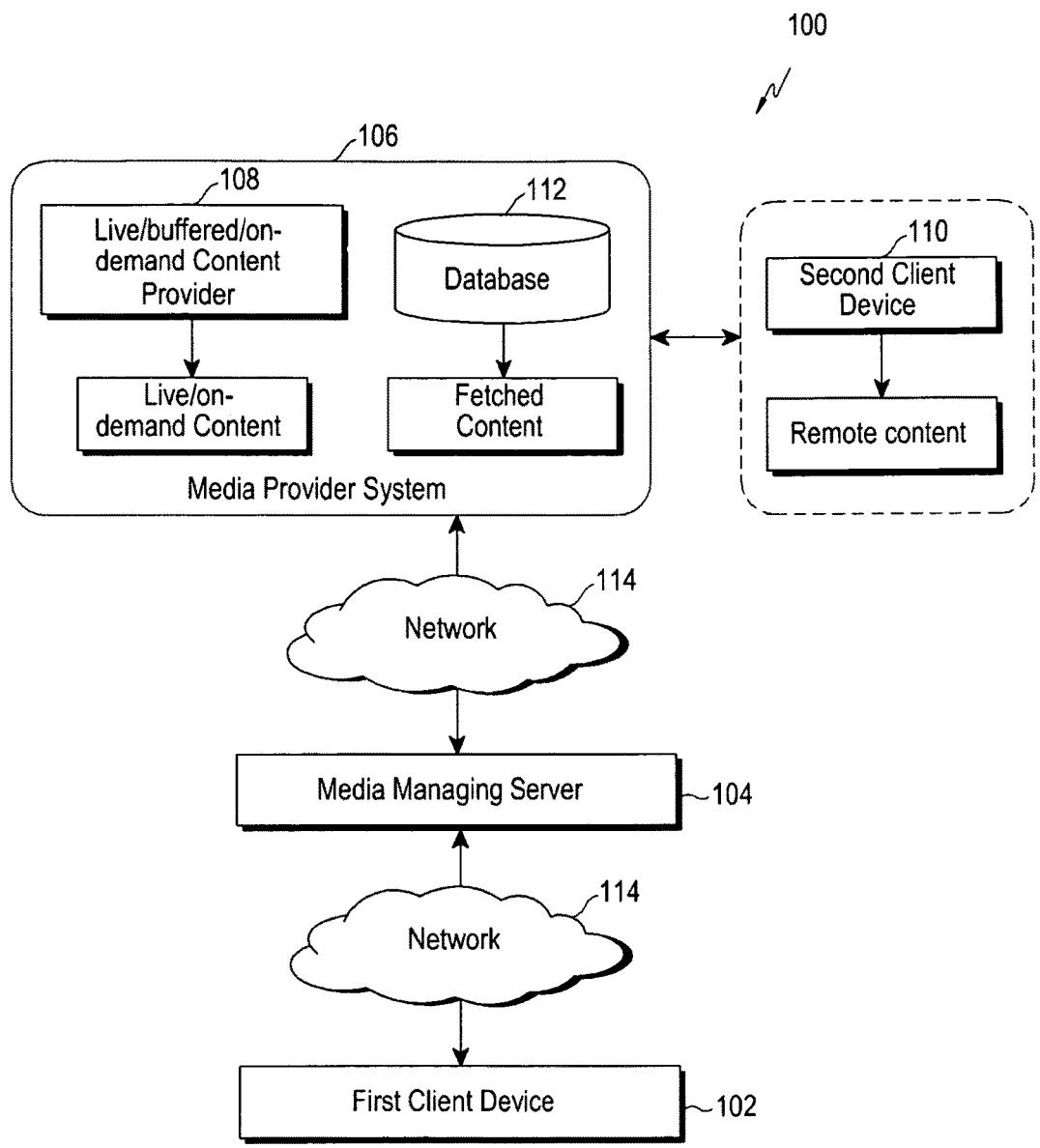
FIG. 1 illustrates a system for experiencing a multimedia service according to an embodiment of the present disclosure.

FIG. 1 illustrates a system 100 for experiencing a multimedia service, according to an embodiment of the present disclosure.

The system 100 has components of multiple levels as illustrated in the figure. The system includes a first client device 102, a media managing server 104, and a media provider system 106. The media managing server 104 and the media provider system 106 are network entities. The connection between the first client device 102 and the media managing server 104 is established by a network 114 which can be wired, wireless or a combination of both. In accordance with the present embodiment, the first client device 102 associated with a user can experience multimedia services through the media managing server 104. The types of contents that can be requested by the user of the first client device 102 include live content or on-demand content or buffered content from a live or buffered media provider system 108, and a fetched content (live or recorded) from a database 112 such as any web server that is connected through the internet with the media managing server 104 or the first client device 102.

The second client device 110, in an embodiment, is a media provider system for a remote content from the second client device 110. The second client device 110 is intended to be connected with the first client device 102 to involve in a multimedia chat, hence the media provider system 106. However, in implementations where the second client device 110 and the first client device 112 are trying to experience through a third party media provider systems such as external databases 112 and the live/buffer media provider system 108, they both are different entities and can interact with each other through the media managing server 104. Some of the embodiments in the present disclosures are directed towards this.

In an embodiment, the media managing server 104 acts as a convergence layer which is responsible for delivering the multimedia service based on selection, configuration, policy, and a set of preferences of the user (the first client device 102) and the media provider system (108, 110, or 112) for an event. In the present embodiment, the second client device 110 is provided as a part of the media provider system 106 due to the reason, during one to one chat session between the first client device 102 and the second client device 110 at certain points in time, the second client device 110 acts as a media provider.

Figure 2A:
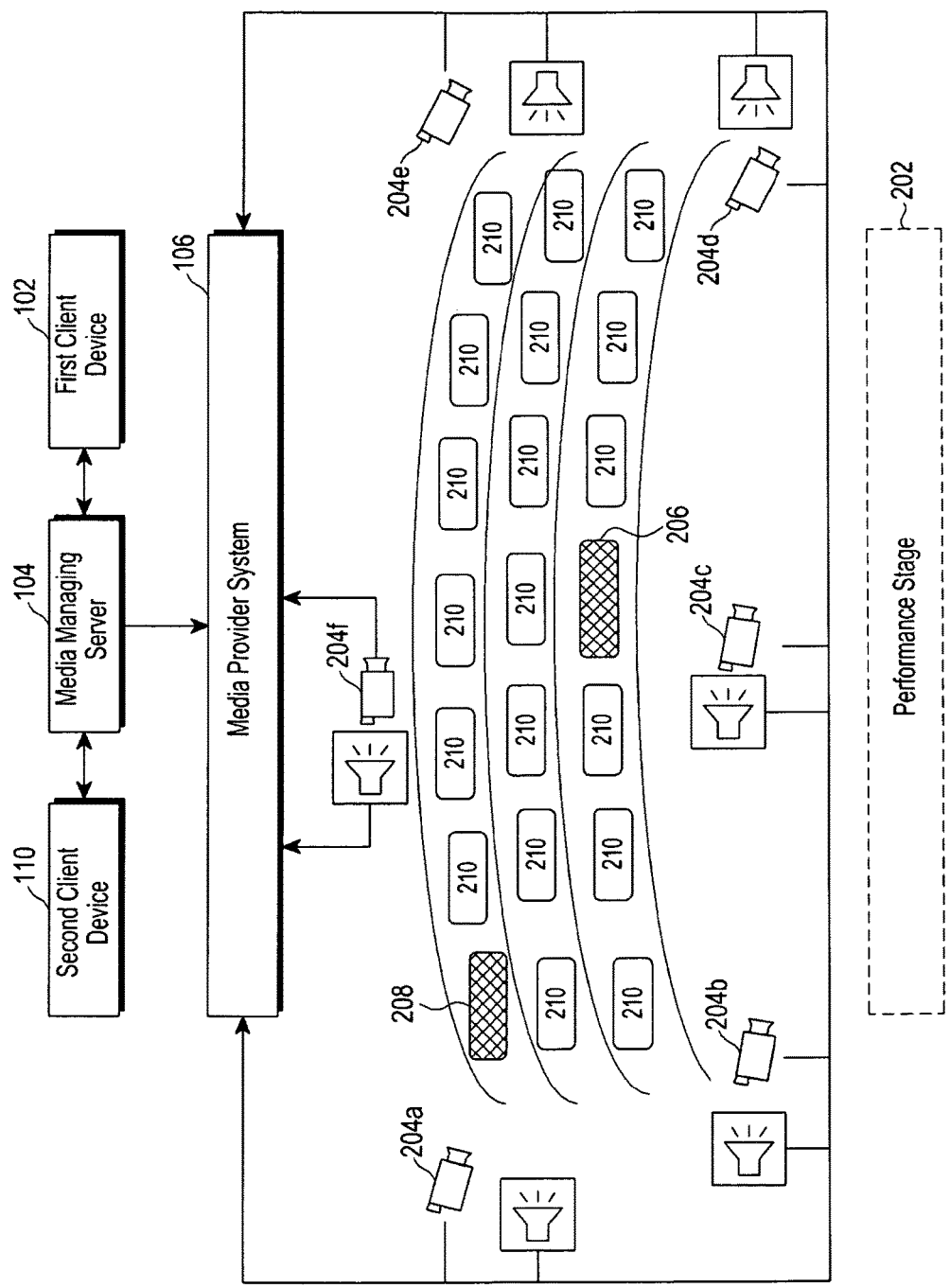
FIG. 2A illustrates an implementation of a multimedia service according to an embodiment of the present disclosure.

FIG. 2A illustrates an implementation of a multimedia service according to an embodiment of the present disclosure.

In accordance with the present embodiment, the implementation of the multimedia service can be explained as the first client device 104 and the second client device 110 are attempting to view a live concert occurring at some remote location, e.g., a concert hall. A performance stage 202 is shown at one end of the figure. In order to cover the concert from multiple perspectives, media capturing and delivering devices such as cameras and microphones/speakers represented collectively as 204a, 204b, 204c, 204d, 204e, and 204f are placed at different parts of the concert hall. The output of all the media capturing and delivering devices 204(a-f) is transmitted to the media provider system 106. The transmission of the content to the content provider can happen through wired network or wireless network or a combination of both. For example, the seats are distributed as rows. Seats that are labeled 210 are not occupied. In the present example, a user of the first client device 102 may be using the seat labeled 206 for the viewing the concert. Another user of the second client device 110 may be using the seat 208 for viewing the concert.

The concert is happening in a remote location, and the users of the first client device 102 and the second client device 110 are logged into the concert virtually using the devices with the help of subscription for the multimedia service at the media managing server 104. For instance, the layout of the concert hall as shown in the FIG. 2A is provided in the display of the first client device 102 and the second client device 110. Thereafter, the user of the first client device 102 and the second client device 110 can select the seat through a virtual application present in the first client device 102 and the second client device 110. On choosing the desired seat in the concert hall, appropriate media capturing and delivering devices 204(a-f) are selected for usage in the current multimedia session of the first client device 102 and the second client device 110.

In the present embodiment, for example, let us consider that the user of the first client device 102 is the first one to initiate the multimedia session and the user of the second client device 110 be a second user joining the multimedia session. In the same example, if the first user is taking a view of the concert from a seat 206 (hatched in the FIG. 2A) and the second user is taking a view of the concert from a seat 208 (hatched in the FIG. 2A), the first user may suggest or recommend or share the view through the subscription in the media managing server 104 to the second user on his/her view. On receiving the recommendation, the second user of the second client device 110 may accept the recommendation and shift the viewing location from 208 to 206. After the shift, the media capturing and delivering devices that are providing inputs to the media provider system 106 is shifted from 204a to 204c.

For example, one of the implementations of the present disclosure is provided. The first user of the first client device 104 opens the terminal, and selects a program to watch. The second user of the second client device 110 is also available and watching another program. The users of the first and second client device 102 and 110 establish a communication session between each other. Thereafter, the first user learns that the second user is watching a different program. The first user may want to watch the same program and view as the second user is watching. The first user may request to start synchronizing with the Content View of the second user. If the second user allows the first user to synchronize the Content View, the first user shall get to watch the same Content View at the same time. Thereafter, the second user changes to another Content View of the same program. The first user may get a notification that the second user has changed to another Content View. The first user's Content View also automatically changes to the same Content View as the second user's. Thereafter, the first user may request to stop synchronizing with the second user's Content View. Further, both the first user and the second user can continue to remain in the communication session while watching different programs.

Throughout the document, the term 'content view' may refer to the view of the user of the first client device 102 and the second client device 104 with respect to the multimedia session logged into. The content view may simply refer to the program or session content with a particular view obtained.

The above mentioned implementations are exemplary in nature and not to be construed as limitation. There can be a number of modifications that can be realized by the person skilled in the art without departing from the spirit or scope of the present disclosure.

Figure 2B:
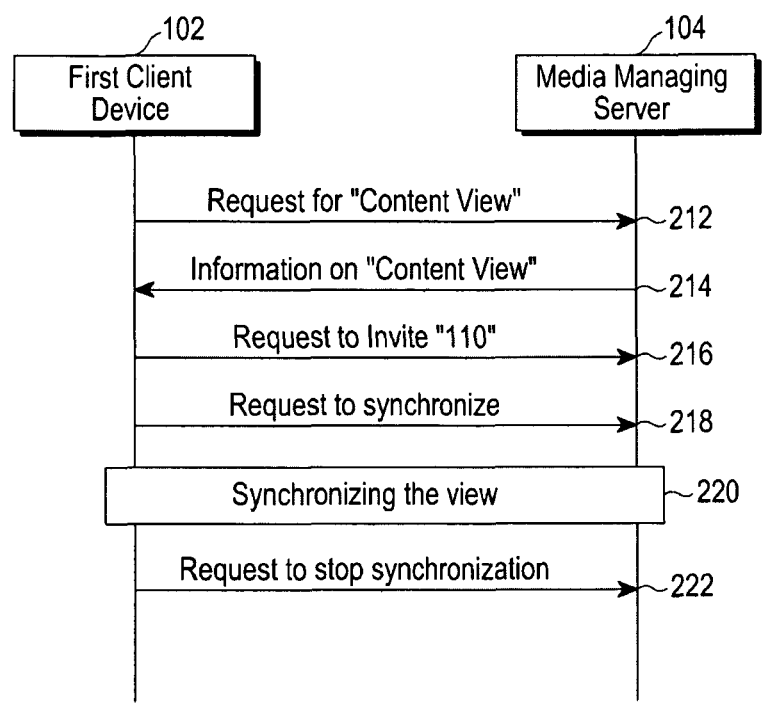
FIG. 2B illustrates another implementation with a flow diagram for illustrating the multimedia service according to an embodiment of the present disclosure.

FIG. 2B illustrates another implementation with a flow diagram for illustrating the multimedia service according to an embodiment of the present disclosure.

At operation 212, the first client device 102 transmits a first request to the media managing server 104 to receive information on content view of the second client device 110. The first client device 102, thereafter, receives updates on changes in the content view of the second client device 110, as in operation 214. In operation 216, the first client device 102 transmits a second request to the media managing server 104 to invite the second client device 110 to join an existing multimedia session. At operation 218, the first client device 102 transmits a third request to the media managing server 104 to initiate the synchronization of the content view of the second client device 110 with the existing multimedia session. Thereafter, in association with the media managing server 104, the first client device 102 synchronizes the content view of the second client device 110 with the existing multimedia session in operation 220. The first client device 102 thereafter sends in operation 222 a fourth request to the media managing server to stop the synchronization of the content view of the second client device with the existing multimedia session.

Figure 3A:
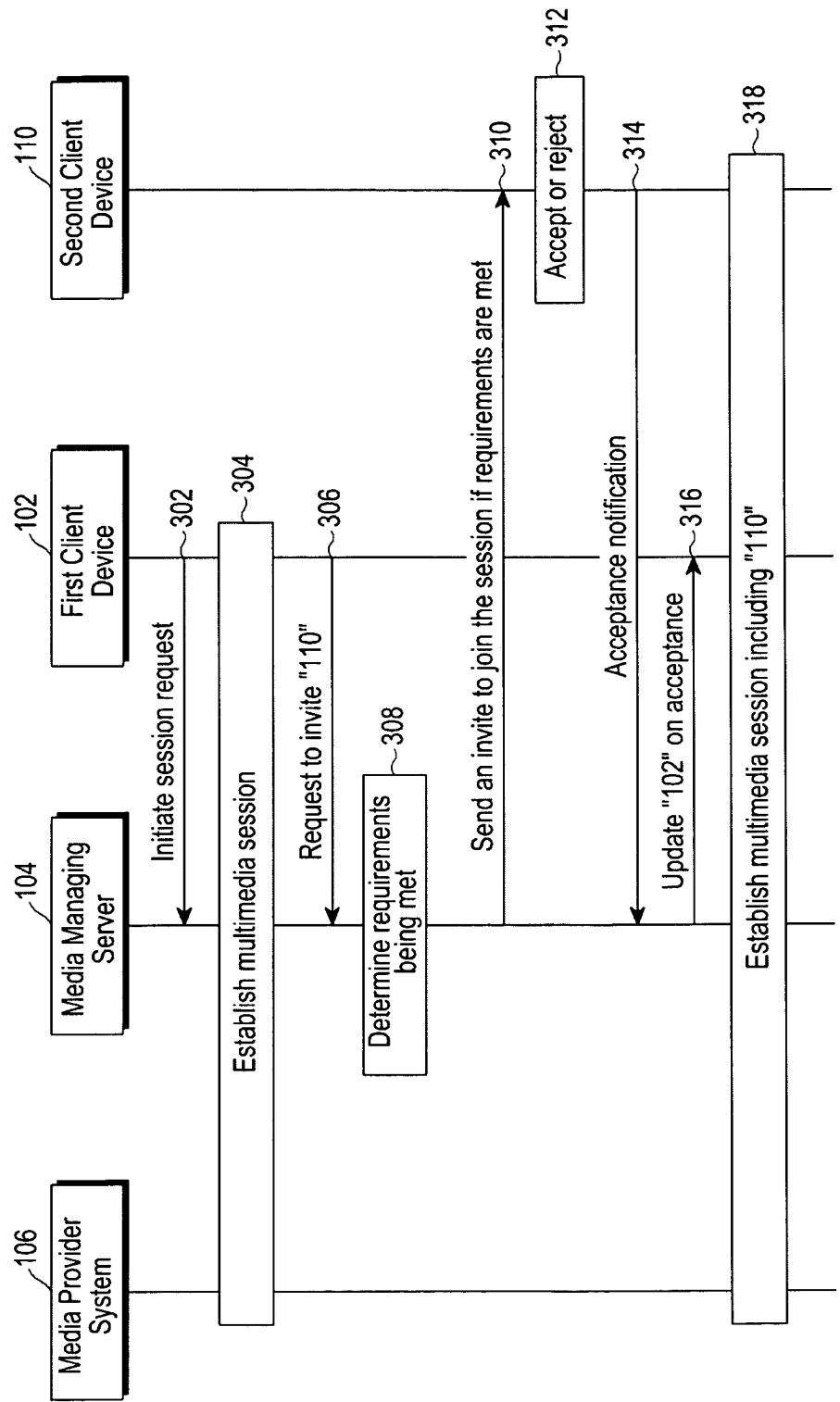
FIG. 3A is a flow diagram illustrating a one or more operations in implementing the multimedia service according to an embodiment of the present disclosure.

FIG. 3A is a flow diagram illustrating a one or more operations in implementing the multimedia service according to an embodiment of the present disclosure.

At operation 302, the first client device 102 sends a request with a set of preferences to initiate a multimedia session by communicating with the media managing server 104. The set of preferences may include a user of the first client device 102's preferences on experiencing the multimedia session provided by the media provider system 106. At operation 304, a multimedia session is established between the first client device 102, the media managing server 104, and the media provider system 106. For example, a Session ID is used to identify a particular session of the multimedia session provided by the media provider system 106, a program delivered by the media provider system 106 be identified with a Program IDentifier (ID), and a particular view, such as an angle or position of various media capturing and delivering devices during the program that is being watched, is identified by the View ID. At operation 306, the first client device 102 sends a request to the media managing server 104 to invite the second client device 110 to the multimedia session. For example, the request contains information such as Program ID, Session ID, View ID, and a Follow Mode ID, where the Follow Mode ID determines whether the invited user has certain control over the view while watching the multimedia session. In the present embodiment, for illustration, the first client device 102 is shown as inviting the second client device 110. However, the first client device 102 may invite a plurality of client devices.

At operation 308, the media managing server 104, upon receiving the request, determines whether the first client device 102 is eligible to send the invitation to get other devices join the multimedia session. This operation may be referred to as an authentication step. If yes, at operation 310, the media managing server 104 sends an invitation to the second client device 110 to join the multimedia session and watch the program. The second client device 110, at operation 312 on receiving the request decides whether to accept or reject the request. The second client device 110 transmits an acceptance notification to the media managing server 104 at operation 314. At operation 316, the first client device 102 receives a notification on the acceptance of the second client device 110. Thereafter, at operation 318, an updated multimedia session is established between the first client device 102, the second client device 110, the media managing server 104, and the media provider system 106.

Figure 3B:
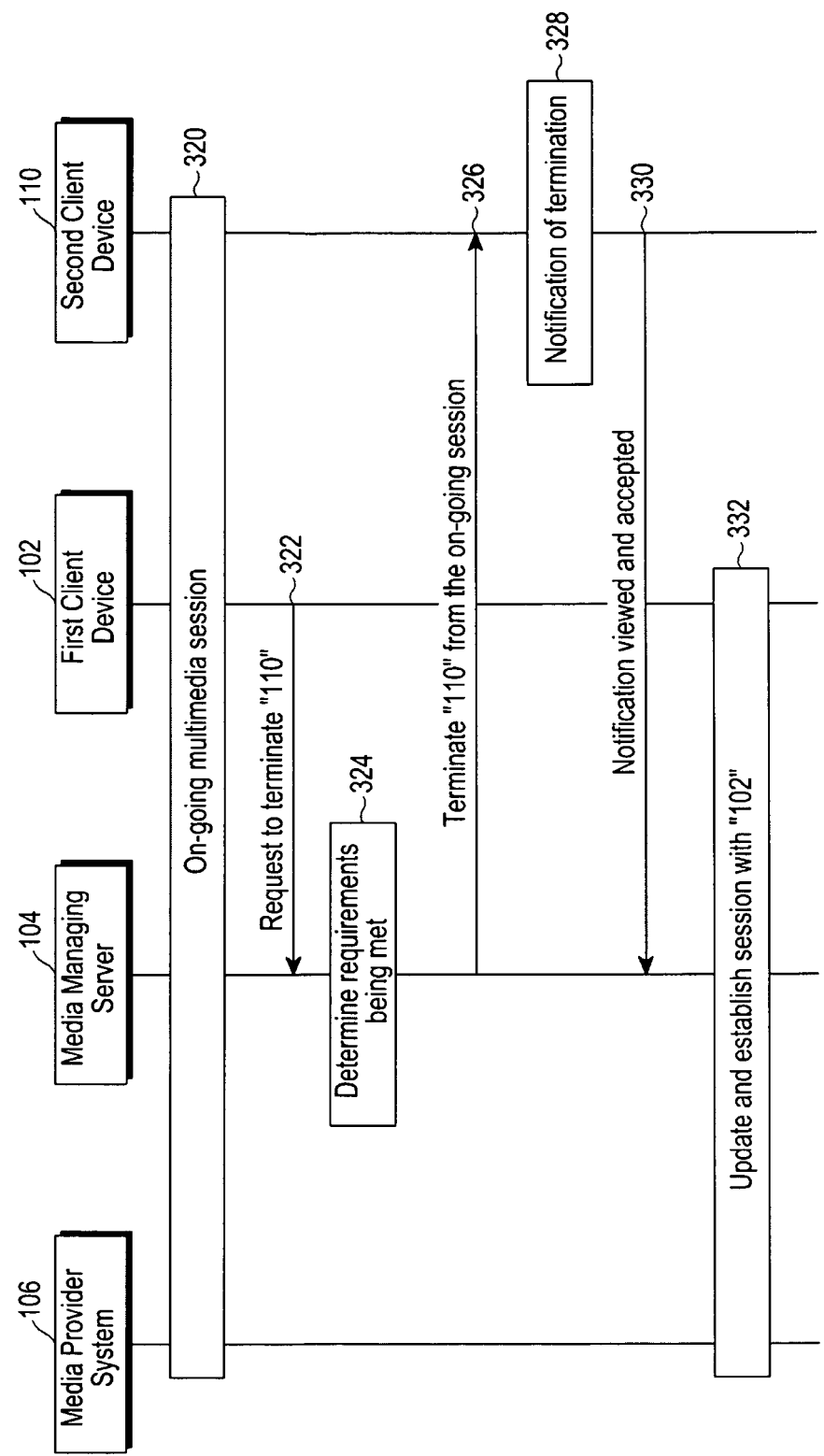
FIG. 3B is a flow diagram illustrating a one or more operations in implementing the multimedia service according to an embodiment of the present disclosure.

FIG. 3B is a flow diagram illustrating operations in implementing the multimedia service according to an embodiment of the present disclosure.

The flow diagram starts with operation 320 of an existing or on-going established multimedia session between the first client device 102, the second client device 110, the media managing server 104, and the media provider system 106. At operation 322, the first client device 102 transmits a request to the media managing server 104 to terminate the session for the second client device 110. At operation 324, the media managing server 104 determines if the first client device 102 is eligible for terminating the second client device 110 from the multimedia session. At operation 326, a termination message is transmitted to the second client device 110 from the media managing server 104. At operation 328, the second client device 110 accepts the termination message with respect to the on-going multimedia session. Thereafter, the second client device 110 transmits an acceptance notification to the media managing server 104 at operation 330. On termination, at operation 332 the session is established between the first client device 102, the media managing server 104, and the media provider system 106.

Figure 3C:
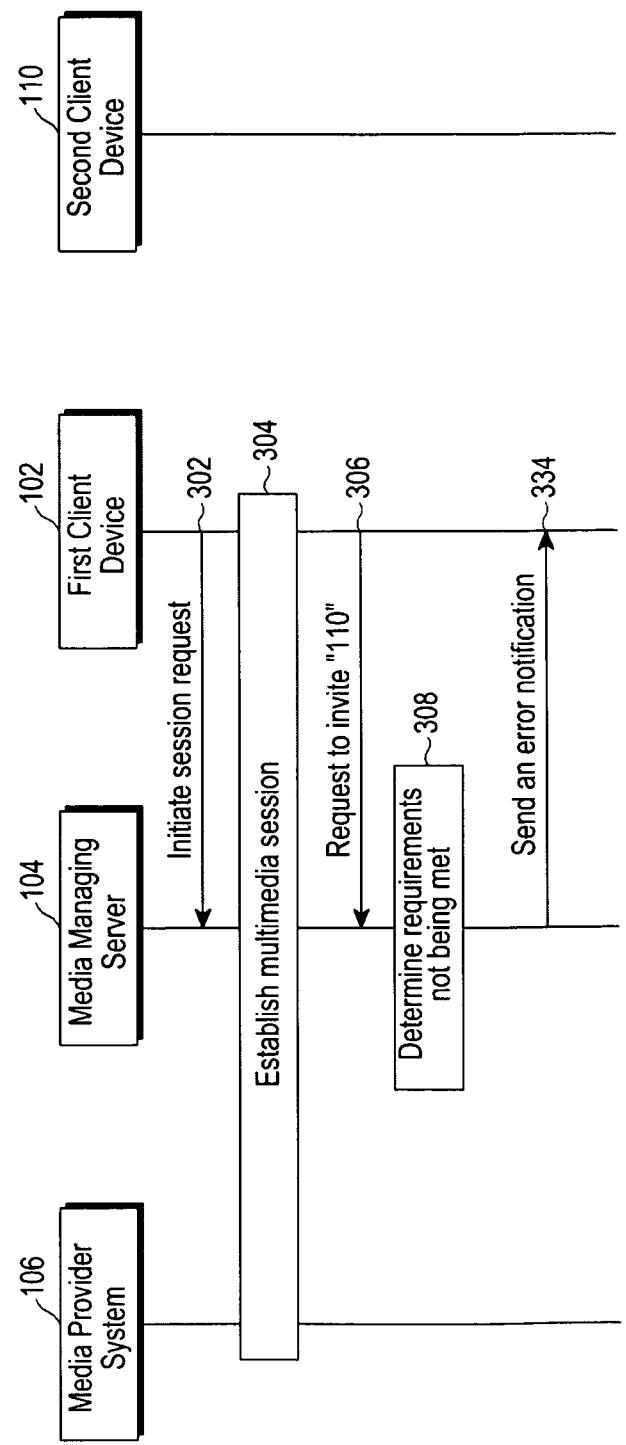
FIG. 3C is a flow diagram illustrating a one or more operations in implementing the multimedia service according to an embodiment of the present disclosure.

FIG. 3C is a flow diagram illustrating operations in implementing the multimedia service according to an embodiment of the present disclosure.

The present embodiment is to show an alternative to the operations of FIG. 3A. The operations 302 to 308 are similar to the ones as explained in the FIG. 3A, and a description thereof will not be repeated. In the present embodiment, at operation 308, the media managing server determines that the first client device 102 is not eligible to send the invitation to other client devices to join the multimedia session. Hence, at operation 334, the media managing server 104 sends an error message to the first client device 102 notifying the ineligibility to send the invitation to the second client device 110.

Figure 3D:
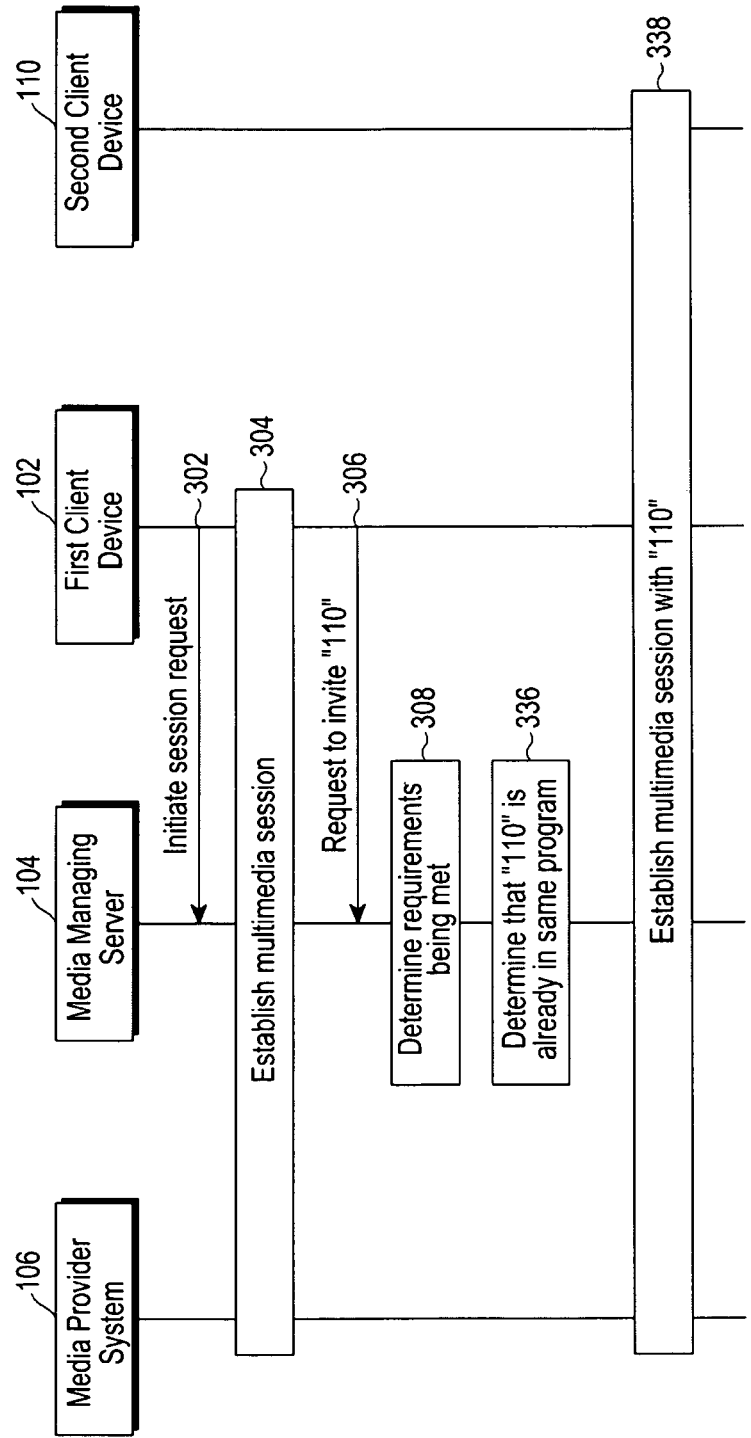
FIG. 3D is a flow diagram illustrating a one or more operations in implementing the multimedia service according to embodiment of the present disclosure.

FIG. 3D is a flow diagram illustrating a one or more operations in implementing the multimedia service according to an embodiment of the present disclosure.

As explained in FIG. 3A, operations 302 to 308 are similar in implementation, and a description thereof will not be repeated. In the present embodiment, at operation 336, upon receiving the request to send an invite from the first client device 102 to the second client device 110, the media managing server 104 identifies and determines that the second client device 110 is in the same program provided by the media provider system 106. At operation 338, an updated session is established between the first client device 102, the second client device 110, the media managing server 104, and the media provider system 106. For example, the session of the second client device 110 is synced with the session of the first client device and a notification may be send to the first client device 102 upon inclusion of the second client device 110.

Figure 3E:
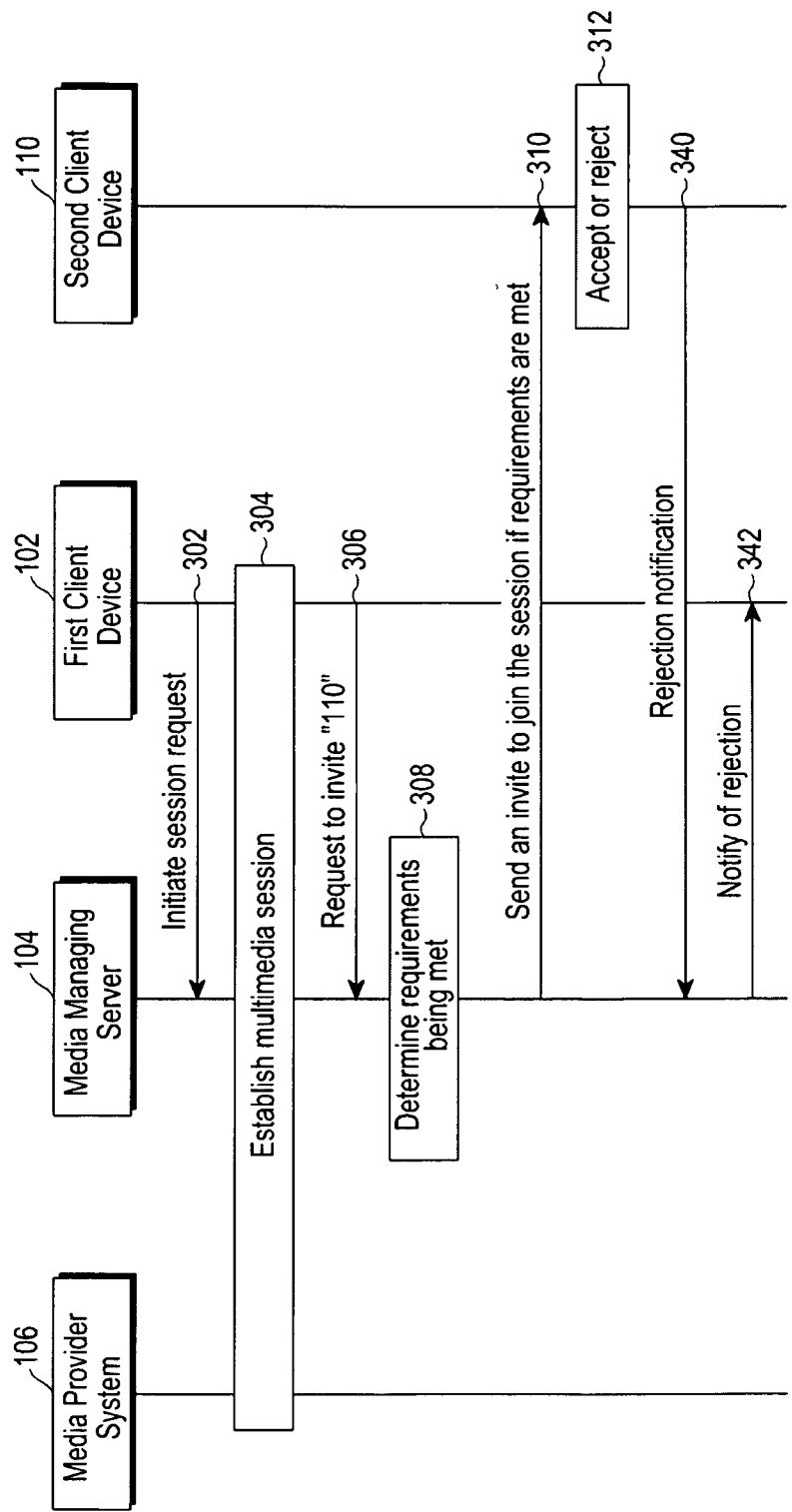
FIG. 3E is a flow diagram illustrating a one or more operations in implementing the multimedia service according to an embodiment of the present disclosure.

FIG. 3E is a flow diagram illustrating operations in implementing the multimedia service according to an embodiment of the present disclosure.

As explained in the FIG. 3A, the operations 302 to 312 are same and will not be explained further. At operation 312, the second client device 110 rejects the invitation to join the multimedia session. At operation 340, the second client device 110 transmits a rejection message to the media managing server 104. At operation 342, the media managing server 104 sends a notification on rejection of the second client device 110 with respect to the invitation to join the session.

Figure 4:
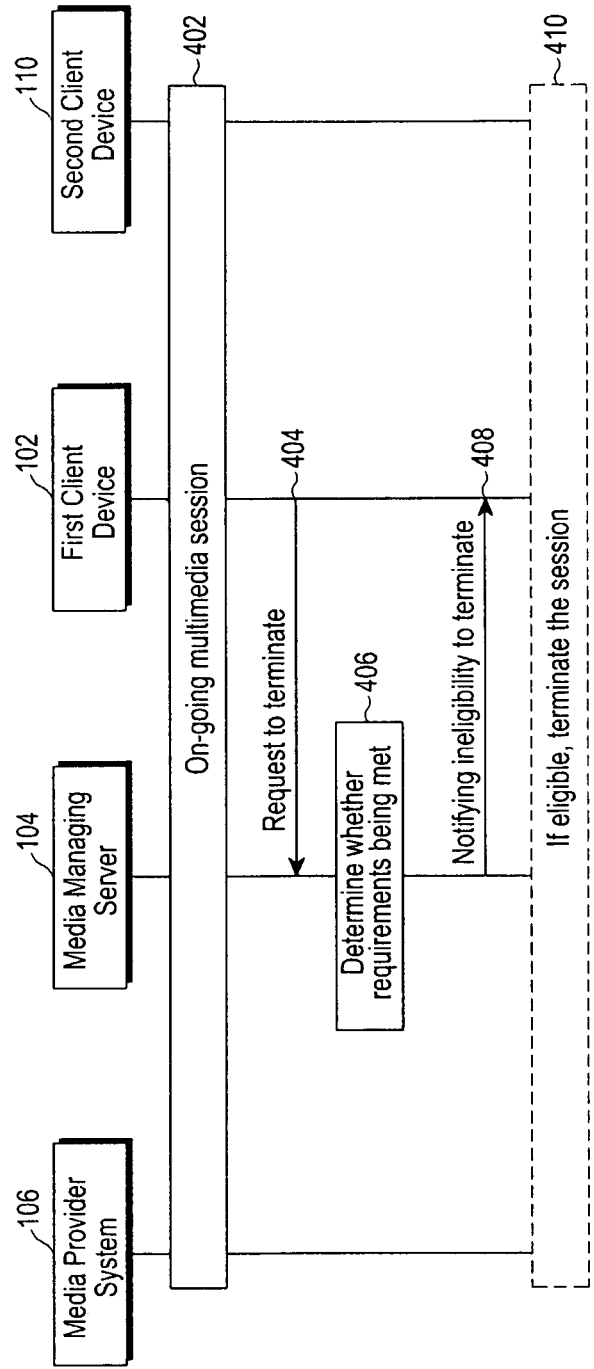
FIG. 4 is a flow diagram illustrating a one or more operations in implementing the multimedia service according to an embodiment of the present disclosure.

FIG. 4 is a flow diagram illustrating operations in implementing the multimedia service according to an embodiment of the present disclosure.

At operation 402, for example, there can be a multimedia session existing between the first client device 102, the second client device 110, the media managing server 104, and the media provider system 106. At operation 404, the first client device 102 may send a request to terminate the on-going session to the media managing server 104. At operation 406, the media managing server 104 determines the eligibility of the first client device 102 to terminate the on-going session. If the first client device 102 is ineligible to terminate the session, the media managing server 104 at operation 408, may send a notification as an error message on not being able to terminate the multimedia session. If the first client device 102 is eligible for termination of the session, at operation 410, the media managing server 104 may terminated the session and notify other entities such as the media provider system 106 and the second client device 110 on termination initiation by the first client device 102.

Figure 5A:
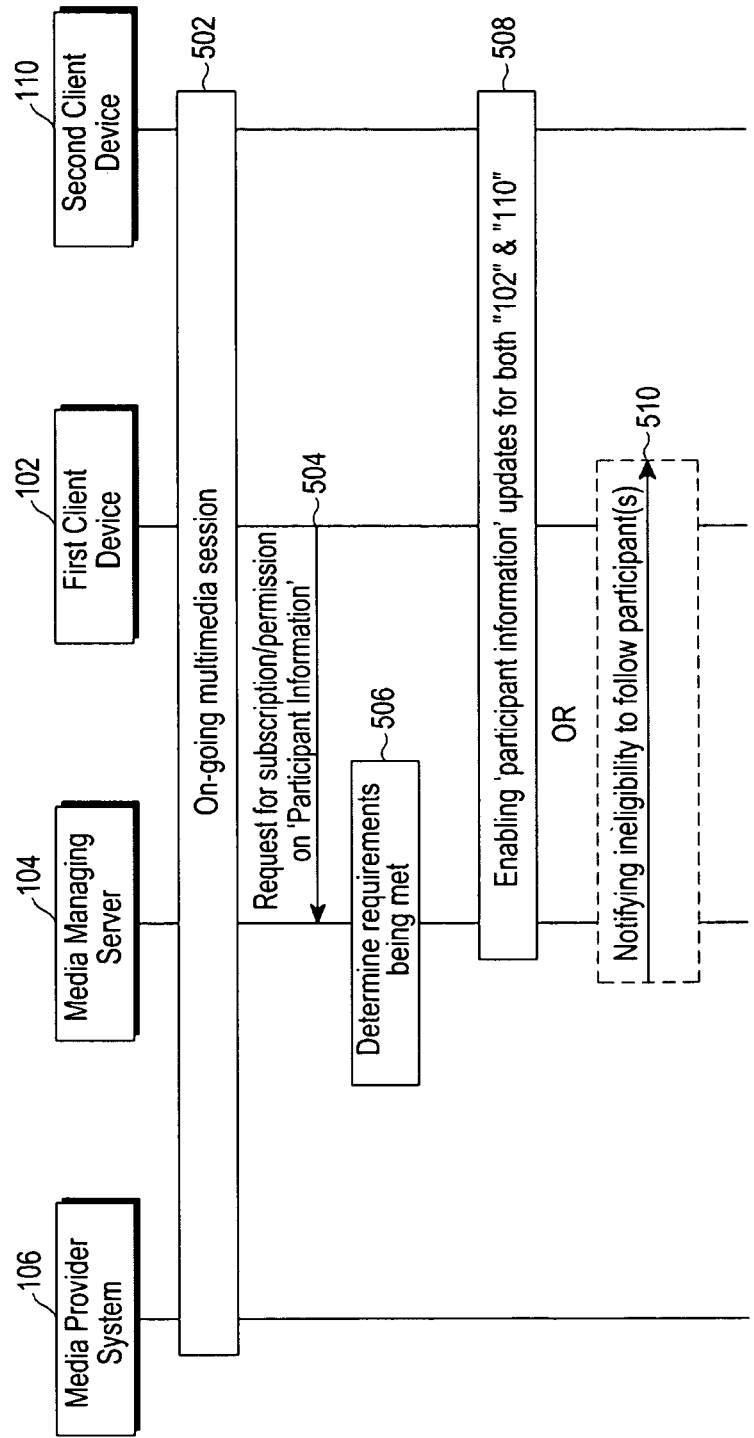
FIG. 5A is a flow diagram illustrating a one or more operations in implementing the multimedia service according to an embodiment of the present disclosure.

FIG. 5A is a flow diagram illustrating operations in implementing the multimedia service according to an embodiment of the present disclosure.

At operation 502, an existing or on-going and established multimedia session is provided between the media provider system 106, the media managing server 104, the first client device 102, and the second client device 110. At operation 504, the first client device transmits a friends follow view for obtaining updates on the multimedia session of the second client device 110. In the present embodiment, it is represented as the first client device 102 requests the media managing server 104 to provide updates on the second client device 110, however, the first client device 102 may request for updates or follow request multiple devices that utilize the multimedia session.

At operation 506, the media managing server 104 determines whether the requirements for the provision of the providing updates on the second client device 110 are satisfied. If the first client device is eligible, at operation 508, the media managing server 104 establishes an updates receiving session between the first client device 102 and the second client device 110.

Alternatively, at operation 510, if the media managing server 104 determines that the first client device 102 is ineligible to receive updater or participant information, the media managing server notifies on the ineligibility to the first client device 102.

Figure 5B:
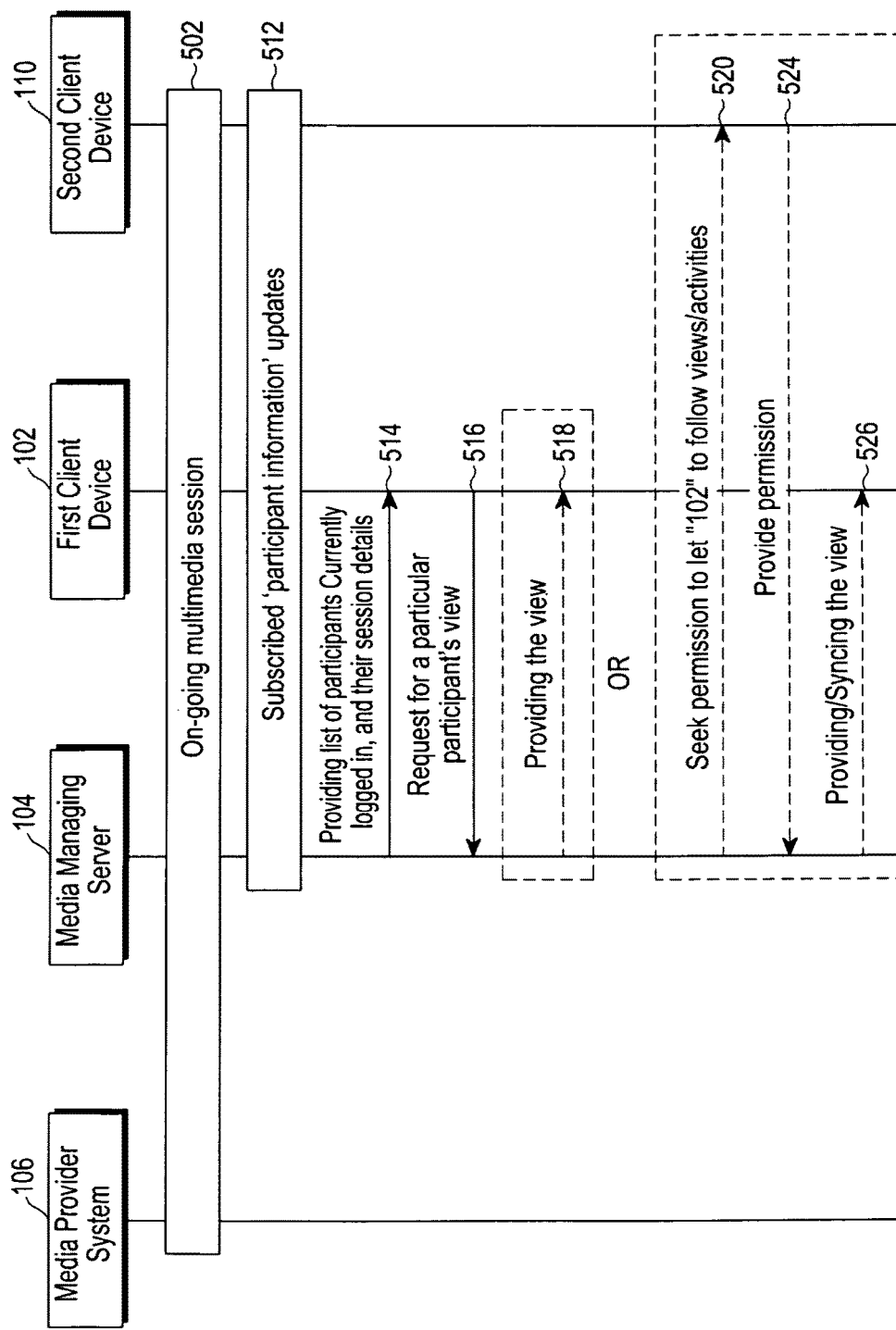
FIG. 5B is a flow diagram illustrating a one or more operations in implementing the multimedia service according to an embodiment of the present disclosure.

FIG. 5B is a flow diagram illustrating operations in implementing the multimedia service according to an embodiment of the present disclosure.

At operation 502, an existing or on-going and established multimedia session is provided between the media provider system 106, the media managing server 104, the first client device 102, and the second client device 110. At 512, it is denoted that the first client device 102 may view and access updates with respect to the multimedia session of the second client device 110. At operation 514, the media managing server 104 provides a notification on a list of participants that are currently logged in the multimedia session. The notification may further include a session ID, program ID, view ID, and other information related to activities of the multimedia session. At operation 516, upon receiving the notification, the first client device 102 transmits a request containing at least one of the session ID, program ID, and view ID of a particular participant in the multimedia session, for example, a user of the second client device 110. On receiving the request, in one embodiment, at operation 518, the media managing server 104 may provide the view of the user of the second client device 110. This occurs when the user of the second client device 110 has already enabled the user of the first client device 102 to log in to the view. Alternatively, at operation 520, the media managing server 104 seeks permission of the user of the second client device 110 to provide approval. At operation 524, the media managing server 104 receives permission of the user of the second client device 110 to provide the view. Thereafter, at operation 526, the media managing server 104 syncs the view of the second client device 110 with the first client device 102.

Figure 5C:
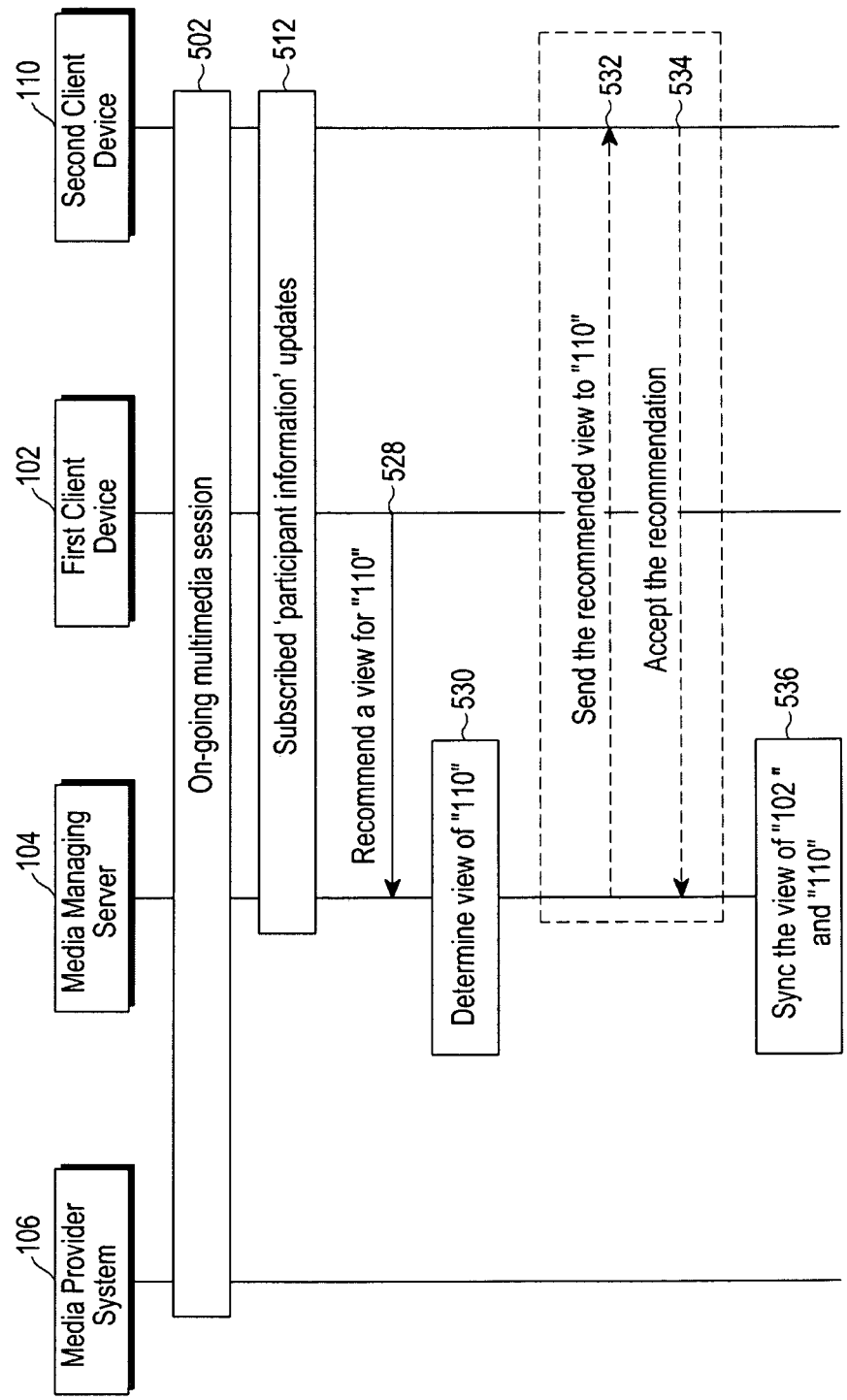
FIG. 5C is a flow diagram illustrating a one or more operations in implementing the multimedia service according to an embodiment of the present disclosure.

FIG. 5C is a flow diagram illustrating operations in implementing the multimedia service according to an embodiment of the present disclosure.

At operation 502, an existing or on-going and established multimedia session is provided between the media provider system 106, the media managing server 104, the first client device 102, and the second client device 110. At 512, it is denoted that the first client device 102 may view and access updates with respect to the multimedia session of the second client device 110.

At operation 528, the user of the first client device 102 may transmit a recommendation of a view of the particular immersive multimedia session. The recommendation can be sent along with the view ID for the media managing server 104 to identify the view. At operation 530, the media managing server 104 determines the view provided by the first client device 102. The media managing server 104, at operation 532, transmits the recommended view provided by the first client device 102 to the second client device 110. The media managing server 104, at operation 534, receives an acceptance from the second client device 110. Thereafter, in operation 536 the view of the first client device 102 and the second client device 110 are synced with respect to the current multimedia session.

Figure 6:
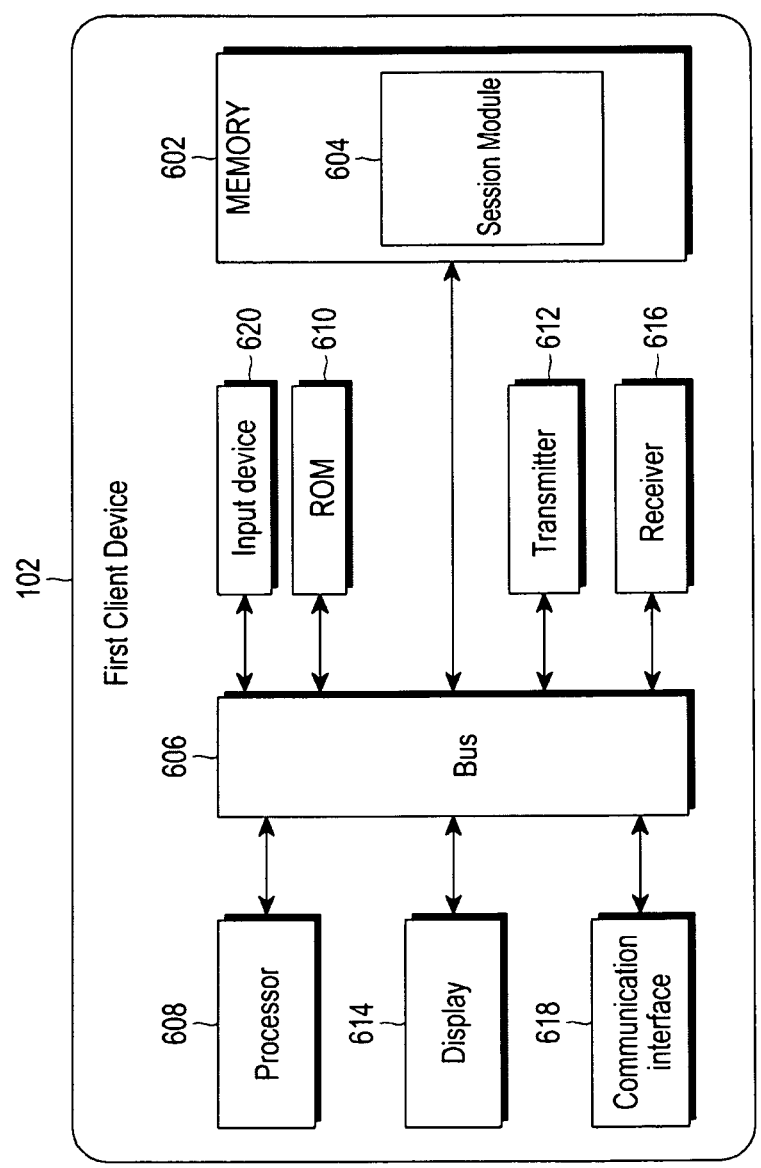
FIG. 6 illustrates a first client device that is configured for utilizing a multimedia service, according to an embodiment of the present disclosure.

FIG. 6 illustrates a first client device that is configured for utilizing a multimedia service, according to an embodiment of the present disclosure.

The first client device 102 includes a processor 608, memory 602, a Read Only Memory (ROM) 610, a transmitter 612, a receiver 616, a bus 606, a communication interface 618, a display 614, and an input device 620.

The processor 608, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 608 may also include embedded controllers, such as generic or programmable logic devices or arrays, application specific integrated circuits, single-chip computers, smart cards, and the like.

The memory 602 may be volatile memory and non-volatile memory. The memory 602 may include a session module 604 that is configured to assist in performing one or more operations performed by the first client device 102 as described in the FIGS. 2B, 3A to 3E, 4, and 5A to 5C, according to the various embodiments of the present disclosure. A variety of computer-readable storage media may be stored in and accessed from the memory elements. Memory elements may include any suitable memory device(s) for storing data and machine-readable instructions, such as Read Only Memory (ROM), Random Access Memory (RAM), Erasable Programmable ROM (EPROM), Electrically Erasable Programmable ROM (EEPROM), hard drive, removable media drive for handling memory cards, Memory Sticks™, and the like.

Various embodiments of the present disclosure may be implemented in conjunction with modules, including functions, procedures, data structures, and application programs, for performing tasks, or defining abstract data types or low-level hardware contexts. The session module 604 is stored in the form of machine-readable instructions on any of the above-mentioned storage media and is executed by the processor 608. In one embodiment, the computer program may be included on a storage medium and loaded from the storage medium to a hard drive in the non-volatile memory.

The components such as the transmitter 612, the receiver 616, the communication interface 618, the display 614, and the input device 620, are well known to the person skilled in the art and hence the explanation thereof is not provided.

Figure 7:
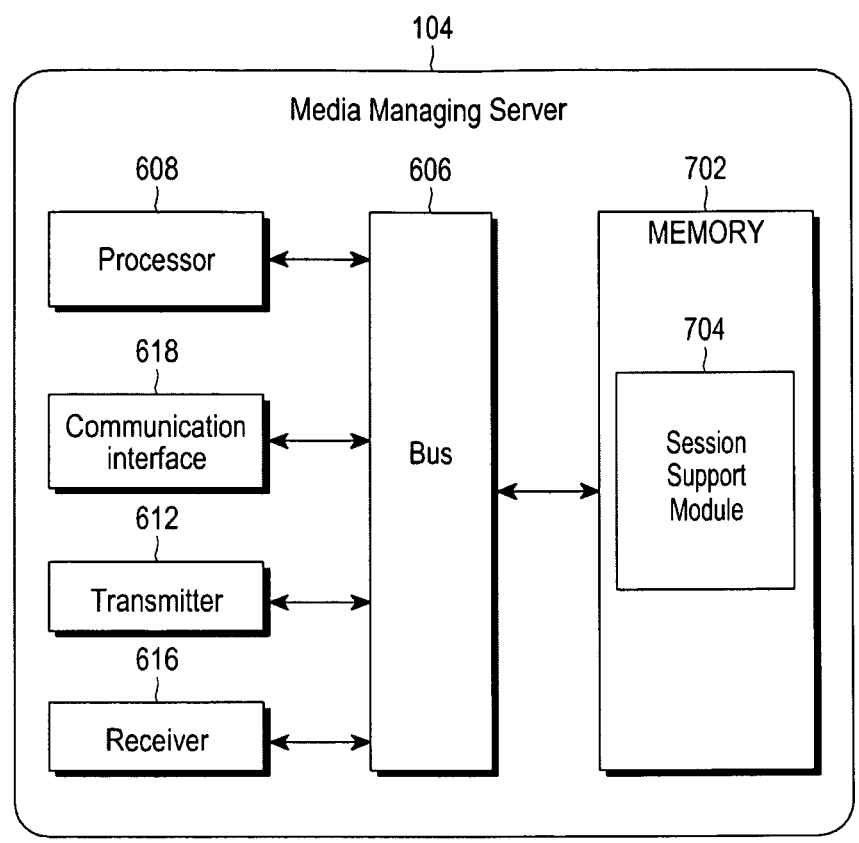
FIG. 7 illustrates a media managing server that is configured for providing a multimedia service, according to an embodiment of the present disclosure.

FIG. 7 illustrates a media managing server that is configured for providing a multimedia service, according to an embodiment of the present disclosure.

The media managing server 104 as shown in FIG. 7, includes the bus 606, the processor 608, the communication interface 618, the transmitter 612, the receiver 616, and memory 702. Components of the media managing server 104 such as the processor 608, the communication interface 618, the transmitter 612, and the receiver 616 are known to the person skilled in the art and shall not be explained further.

The memory 702 includes a session support module 704 configured to assist in performing one or more operations performed by the media managing server 104 as explained in the FIGS. 2B, 3A to 3E, 4, and 5A to 5C as per various embodiments of the present disclosure.

Various embodiments of the present subject matter may be implemented in conjunction with modules, including functions, procedures, data structures, and application programs, for performing tasks, or defining abstract data types or low-level hardware contexts. Machine-readable instructions stored on any non-transitory storage media may be executable by a processor.

The present various embodiments have been described with reference to specific example embodiments; it will be evident that various modifications and changes may be made to these embodiments without departing from the broader spirit and scope of the various embodiments. Furthermore, the various devices, modules, selectors, estimators, and the like described herein may be enabled and operated using hardware circuitry, for example, Complementary Metal Oxide Semiconductor (CMOS) based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of content viewing by a first client device, the method comprising:
   transmitting, by the first client device, a first request to a server to invite a second client device to join into the content viewing and to request the server to establish a content viewing session for the first client device and the second client device;
   receiving, by the first client device, a response from the server, the response indicating an acceptance of the second client device for joining into the content viewing; and
   transmitting, by the first client device, a second request for stopping synchronization of the content viewing between the first client device and the second client device to the server,
   wherein media data for the content viewing is synchronously transmitted from the server to each of the first client device and the second client device through the content viewing session, and
   wherein the synchronous transmitting of the media data to each of the first client device and the second client device stops in response to the second request.

2. The method of claim 1, wherein a media session between the server and a content provider is established by the server.

3. The method of claim 1, wherein the second client device comprises a plurality of client devices.

4. A method of content viewing by a server, the method comprising:
   receiving, by the server, a first request from a first client device to invite a second client device to join into the content viewing;
   transmitting, by the server, the first request to the second client device;
   receiving, by the server, a response from the second client device, the response indicating an acceptance for joining into the content viewing;
   transmitting, by the server, the response to the first client device;
   establishing, by the server, a content viewing session for the first client device and the second client device;
   synchronously transmitting, by the server, media data for the content viewing to each of the first client device and to the second client device through the content viewing session;
   receiving, by the server, a second request for stopping synchronization of the content viewing between the first client device and the second client device from the first client device; and
   stopping the synchronous transmitting of the media data to each of the first client device and the second client device in response to the second request.

5. The method of claim 4, further comprising establishing, by the server, a media session between the server and a content provider.

6. The method of claim 4, wherein the second client device comprises a plurality of client devices.

7. A method of content viewing by a second client device, the method comprising:
   receiving, by the second client device, a first request from a server to invite the second client device to join into the content viewing; and
   transmitting, by the second client device, a response to the server, the response indicating an acceptance for joining into the content viewing,
   wherein a content viewing session for a first client device and the second client device is established by the server,
   wherein media data for the content viewing is synchronously transmitted from the server to each of the first client device and the second client device through the content viewing session, and
   wherein the synchronous transmitting of the media data to each of the first client device and the second client device stops in response to the server receiving a second request, for stopping synchronization of the content viewing between the first client device and the second client device, from the first client device.

8. The method of claim 7, wherein a media session between the server and a content provider is established by the server.

9. The method of claim 7, wherein the second client device is comprised by a plurality of client devices.

10. An apparatus in a first client device for content viewing, the apparatus comprising:
    a memory configured to store instructions; and
    a transceiver configured to:
        transmit a first request to a server to invite a second client device to join into the content viewing and to request the server to establish a content viewing session for the first client device and the second client device,
        receive a response from the server, the response indicating an acceptance of the second client device for joining into the content viewing, and
        transmit a second request for stopping synchronization of the content viewing between the first client device and the second client device to the server,
    wherein media data for the content viewing is synchronously transmitted from the server to each of the first client device and the second client device through the content viewing session, and
    wherein the synchronous transmitting of the media data to each of the first client device and the second client device stops in response to the second request.

11. The apparatus of claim 10, wherein a media session between the server and a content provider is established by the server.

12. The apparatus of claim 10, wherein the second client device comprises a plurality of client devices.

13. An apparatus in a server for providing content viewing, the apparatus comprising:
    a memory configured to store instructions;
    a transceiver configured to:
        receive a first request from a first client device to invite a second client device to join into the content viewing,
        transmit the first request to the second client device,
        receive a response from the second client device, the response indicating an acceptance for joining into the content viewing,
        transmit the response to the first client device, and receive a second request for stopping synchronization of the content viewing between the first client device and the second client device from the first client device; and at least one processor configured to establish a content viewing session for the first client device and the second client device, wherein the transceiver is further configured to:

synchronously transmit media data for the content viewing to each of the first client device and the second client device through the content viewing session, and stop the synchronous transmitting of the media data to each of the first client device and the second client device in response to the second request.

14. The apparatus of claim 13, wherein the server is configured to establish a media session between the server and a content provider.

15. The apparatus of claim 13, wherein the second client device comprises a plurality of client devices.

16. An apparatus in a second client device for content viewing, the apparatus comprising:

a memory configured to store instructions; and a transceiver configured to:

receive a first request from a server to invite the second client device to join into the content viewing, transmit a response to the server, the response indicating an acceptance for joining into the content viewing, wherein a content viewing session for a first client device and the second client device is established by the server, wherein media data for the content viewing is synchronously transmitted from the server to each of the first client device and the second client device through the content viewing session, and wherein the synchronous transmitting of the media data to each of the first client device and the second client device stops in response to the server receiving a second request, for stopping synchronization of the content viewing between the first client device and the second client device, from the first client device.

17. The apparatus of claim 16, wherein a media session between the server and a content provider is established by the server.

18. The apparatus of claim 16, wherein the second client device is comprised by a plurality of client devices.

19. The method of claim 4, further comprising stopping, by the server, transmitting the media data for the content viewing to the first client device and the second client device, in response to the second request.

* * * * *